United States Patent
Schwartz et al.

[11] 3,879,849
[45] Apr. 29, 1975

[54] ORTHODONTIC APPLIANCE SYSTEM

[76] Inventors: Robert Schwartz, 1271 Westfield Ave., Rahway, N.J. 07450; Morris Goldberg, 14 Vanderventer Ave., Port Washington, N.Y. 10050

[22] Filed: Oct. 16, 1972

[21] Appl. No.: 297,901

[52] U.S. Cl.............. 32/14 R; 32/40 R; 33/143 C; 128/2 S
[51] Int. Cl................................................ A61c 7/00
[58] Field of Search............ 32/40 R, 14; 33/149 R, 33/143 C, 174 D; 128/2 S, 361

[56] References Cited
UNITED STATES PATENTS

| | | | |
|---|---|---|---|
| 1,190,180 | 7/1916 | McAllister | 32/14 R |
| 2,014,289 | 9/1935 | Page | 32/40 R X |
| 2,501,098 | 3/1950 | Rutledge, Sr. | 33/149 R |

OTHER PUBLICATIONS
"Vemco Drawing Instruments," p. 15, June 13, 1952.

*Primary Examiner*—Louis G. Mancene
*Assistant Examiner*—J. Q. Lever
*Attorney, Agent, or Firm*—Jerome E. Luecke

[57] ABSTRACT

Diagnostic measurements needed to determine the progress of treatment with orthodontic appliances are made with an appliance system comprising at least four gauge members, each gauge member comprising a handle interconnected with opposed pointer members that are maintained in a fixed position relative to each other. Each pointer member has a terminal portion and the distance between the terminal portions of the opposed pointer members of each gauge member defines a different cross-arch width distance or arch length distance between anatomical features of the maxilliary or mandibular arches. Typically, at least two of the gauge members define cross-arch width distances between anatomical features of the maxillary arch and at least two of the gauge members define cross-arch width distances between anatomical features of the mandibular arch.

2 Claims, 2 Drawing Figures

3,879,849

ORTHODONTIC APPLIANCE SYSTEM

BACKGROUND OF THE INVENTION

Field of the Invention

The present invention is directed to an orthodontic appliance system useful in the measurement of cross-arch width and arch length distances of the human dental anatomy. More particularly, the instant invention is concerned with an orthodontic appliance system useful in determining the effect of orthodontic treatment with various appliance systems.

In the practice of orthodontia, malocclusion problems are frequently treated utilizing various wire appliance systems. For example, in the practice of the Begg technique, Johnson Twin-Arch technique and the Crozat technique, fine wire appliances are used alone or in conjunction with selected tooth extractions to correct malocclusion problems. Utilizing any of the aforementioned techniques, the practitioner endeavors to bring the dentition of the patient into conformance with standard maxillary or mandibular arch indices or symmetry charts. Because of unpredictable tooth movement and trauma rendered to the appliance during its use by the patient and/or careless handling by the patient, frequent measurements need to be made to ascertain whether the treatment is, in fact, bringing the dentition of the patient into conformance with the desired predetermined arch index or arch symmetry chart. Frequently, the desired measurements are secured by comparing cross-arch and/or arch length distances measured with a vernier caliper with the desired cross-arch and/or arch length distances as indicated on a standard arch index or arch symmetry chart. This type of measurement technique is extremely cumbersome and errors can be made easily.

BRIEF DESCRIPTION OF THE DRAWINGS

The invention will be more readily understood by reference to the accompanying drawings in which.

Figure 2:
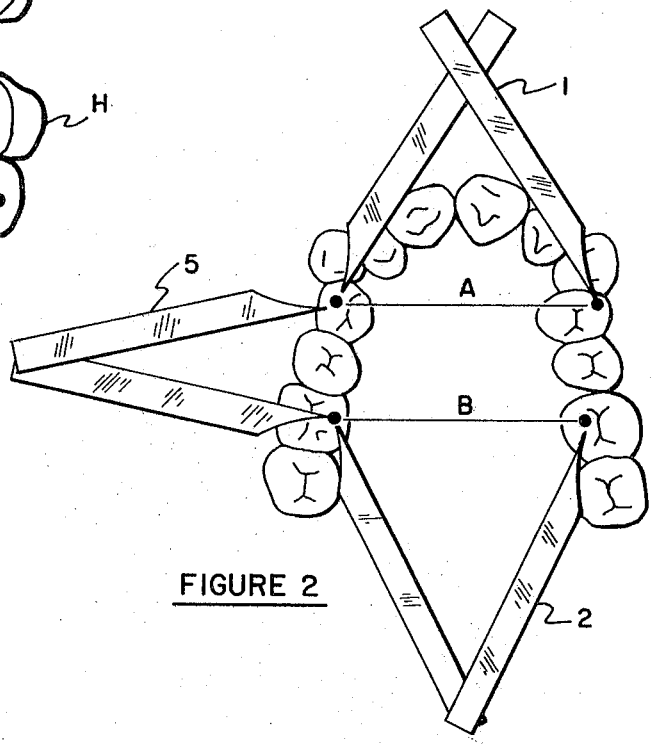
Figure 2:
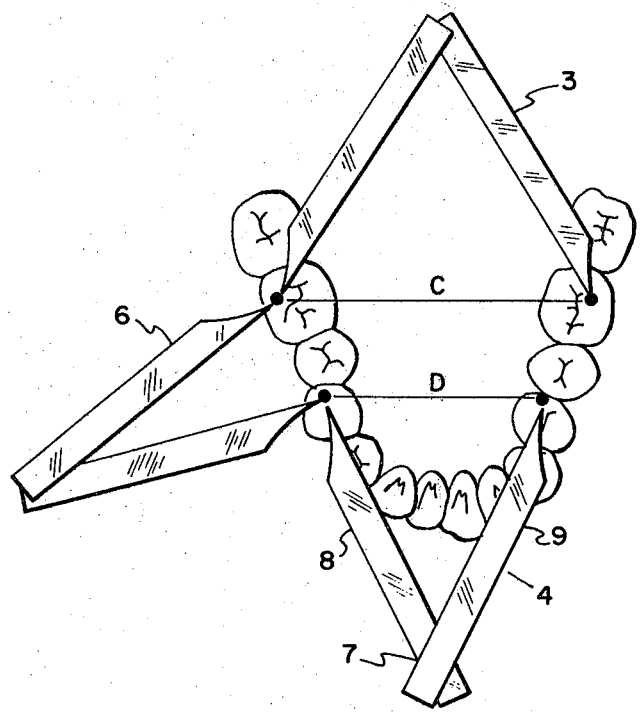

Referring now the the Figures, the orthodontic appliance system of the present invention comprises gauge members 1–6. The appliance system depicted in FIG. 2 is made up of four cross-arch gauge members 1–4 and two arch length gauge members 5 and 6. The appliance system is ordinarily made up of at least four gauge members. Typically, the appliance system will be made up of at least two maxillary cross-arch members and two mandibular cross-arch members. Alternatively, the appliance system may comprise a single maxillary arch-length member and one or more maxillary cross-arch gauge members together with a single mandibular arch-length member and one or more mandibular cross-arch members. Each of the gauge members is composed of a handle member 7 which is interconnected with opposed pointer members 8 and 9 that are maintained in a fixed position relative to each other. The terminal portions of pointer members 8 and 9 of each gauge member define a cross-arch width distance or arch length distance between certain anatomical features of the maxillary or mandibular arches. The distance enclosed within the pointer members of each gauge member corresponds to ideal cross-arch width distances or arch length distances taken from a standard arch index or arch symmetry chart applicable to the patient's dentition.

Figure 1:
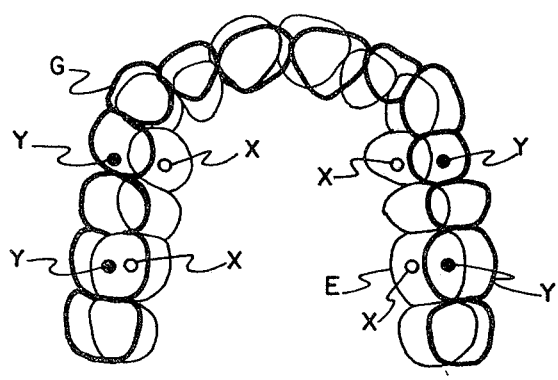
FIG. 1 depicts maloccluded maxillary and mandibular arch structures and superimposed maxillary and mandibular arches that conform to predetermined arch indices and FIG. 2 depicts the use of four different cross-arch gauge members and two arch length gauge members to ascertain whether the different cross-arch and arch length distances of a maloccluded maxillary and mandibular arch structure are in conformance with the desired index or symmetry chart.
Figure 1:
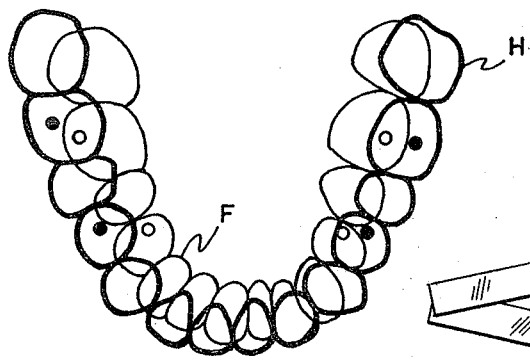

The gauge members are preferably of a "V" type structure as is shown in FIG. 1. However, other configurations can be employed such as a "T" type structure wherein the leg of the T serves as the handle and the cross-arm of the T makes up the necessary pointer members. The gauge members may be fabricated of any rigid material. The gauge members may be formed from a metal; however, for reasons of economy, it is preferred that the gauge members be formed from a thermoplastic material such as polyethylene, polypropylene, polystyrene, etc. Each of the gauge members may be marked or color coded to indicate to the practitioner the points on the maxillary or mandibular arch indices or symmetry charts that correspond to the cross-arch or arch length distances defined by the terminal portions of the pointer members of each of the gauge members.

At least two of the gauge members making up the instant appliance system define two different ideal (as specified by an arch symmetry chart or arch index) cross-arch width distances or at least one cross-arch width distance and one arch length distance between anatomical features of the maxillary arch (upper segments of FIGS. 1 and 2). For example, as shown in FIG. 2, gauge member 1 defines an ideal cross-arch width distance (A) between the lingual cusps of the upper first premolars. Gauge member 2 defines an ideal cross-arch width distance (B) between the central fossae of the upper 6-year molars. As is also shown in FIG. 2, gauge member 3 defines an ideal cross-arch width distance (C) between the mid-buccal cusps of the lower 6-year molars (first molars). The terminal portions of the opposed pointer members of gauge member 4 define an ideal cross-arch distance (D) between the distal pit of the lower first premolar to the distal pit of the opposite first premolar. Gauge member 5 encompasses the arch length distance between the lingual cusps of the upper first premolar and the central fossae of the upper 6-year molar. Gauge member 6 defines the distance (arch length) between the mid-buccal cusps of the lower 6-year molar and the distal pit of the lower first premolar.

In practice, the orthodontist fits the patient with an appliance that is designed to bring a patient's maloccluded arch structure as is shown at E and F of FIG. 1 closely into conformance with the dimensions of a selected arch index as depicted at G and H of FIG. 1. Typically, the patient is examined at periodic intervals to determine the progress of the orthodontic treatment. The progress of the work being done is readily ascertained utilizing the appliance system of the instant invention. Specifically, the practitioner places the gauge member within the mouth of the patient and determines whether the distance between the terminal portions of the pointer members of the gauge member (which corresponds to an ideal cross-arch or arch length distance as defined by an appropriate arch symmetry chart of arch index) is congruent with the corresponding cross-arch distance of the patient's dentition. By way of example, the orthodontist would endeavor to move the patient's dentition such that anatomical landmarks X of arch E and arch F are brought into congruence with anatomical landmarks Y of ideal (from indices or charts) arches G and H. By utilizing (*a*) at least two gauge members that define maxillary cross-arch distances corresponding to ideal arch index distances and two additional gauge members that define mandibular cross-arch distances corresponding to ideal arch index distances, or (*b*) at least one gauge member that defines a maxillary cross-arch distance and at least one gauge member to define a maxillary arch length (side of the arch) distance and additional mandibular gauge members comprising at least one gauge member that defines a mandibular cross-arch distance and at least one gauge member that defines a mandibular arch length distance, the orthodontist can make quick, meaningful comparisons of his patient's actual cross-arch and/or arch length dentition distances with an ideal cross-arch or arch length distance corresponding to an appropriate arch index or arch symmetry chart.

What is claimed is:

1. An orthodontic appliance system comprising at least four gauge members, said gauge members each comprising a handle member interconnected with opposed pointer members that are maintained in a fixed position relative to each other, each pointer member having a terminal portion, the terminal portions of the opposed pointer members of said gauge member defining a cross-arch width distance between anatomical features of ideal maxillary and mandibular arch structures, at least two of said gauge members defining cross-arch width distances between anatomical features of the maxillary arch and at least two of said gauge members defining cross-arch width distances between anatomical features of the mandibular arch.

2. An orthodontic appliance system comprising at least four gauge members, said gauge members each comprising a handle member interconnected with opposing pointer members that are maintained in a fixed position relative to each other, each pointer member having a terminal portion, the terminal portions of the opposed pointer members of said gauge member defining a distance between anatomical features of ideal maxillary and mandibular arch structures, at least one of said gauge members defining a maxillary cross-arch width distance, at least one of said gauge members defining a maxillary arch length distance, at least one of said gauge members defining a mandibular cross-arch distance and at least one of said gauge members defining a mandibular arch length distance.

* * * * *